United States Patent [19]
Kindler et al.

[11] Patent Number: 4,734,466
[45] Date of Patent: * Mar. 29, 1988

[54] MODIFIED POLYBENZIMIDAZOLE POLYMER MEMBRANES

[75] Inventors: Andrew Kindler, Hermosa Beach, Calif.; Esther A. Bower, Flemington, N.J.; Joseph J. Rafalko, Chatham, N.J.; Michael J. Sansone, Berkeley Heights, N.J.

[73] Assignee: Hoechst Celanese Corporation, Somerville, N.J.

[*] Notice: The portion of the term of this patent subsequent to Jul. 8, 2003 has been disclaimed.

[21] Appl. No.: 878,535

[22] Filed: Jun. 25, 1986

Related U.S. Application Data

[63] Continuation-in-part of Ser. No. 691,962, Jan. 16, 1985, Pat. No. 4,599,388.

[51] Int. Cl.$^4$ .................. C08G 69/26; C08G 69/28; C08G 73/18; C08L 69/00
[52] U.S. Cl. .................................. 525/433; 528/341; 528/342
[58] Field of Search ................ 525/433; 528/341, 342

[56] References Cited

U.S. PATENT DOCUMENTS

| | | | |
|---|---|---|---|
| 3,758,644 | 5/1971 | Trischler | 524/233 |
| 4,020,142 | 4/1977 | Davis et al. | 525/433 |
| 4,599,388 | 7/1986 | Bower et al. | 525/433 |

*Primary Examiner*—Herbert J. Lilling
*Attorney, Agent, or Firm*—Lynch, Cox, Gilman & Mahan

[57] ABSTRACT

The invention provides a substituted polybenzimidazole product produced by employing a cyclic carbonate to attach hydroxyalkyl substituents at the reactive imidazole hydrogen sites on the polybenzimidazole polymer. The substituted polybenzimidazole polymer membranes produced by this process exhibit improved hydrophilicity and chemical stability over prior art polybenzimidazole membranes. Substituted polybenzimidazole polymer ultrafilters produced by this process filter a broad range of molecular weight compounds.

35 Claims, No Drawings

MODIFIED POLYBENZIMIDAZOLE POLYMER MEMBRANES

(b) CROSS REFERENCE TO RELATED APPLICATIONS

This application is a continuation-in-part of copending patent application Ser. No. 691,962 filed Jan. 16, 1985, now U.S. Pat. No. 4,599,388, entitled 'PROCESS FOR MODIFYING POLYBENZIMIDAZOLE POLYMERS WITH ETHYLENE CARBONATES, and assigned to the assignee of the current invention.

(c) STATEMENT AS TO RIGHTS TO INVENTIONS MADE UNDER FEDERALLY SPONSORED RESEARCH AND DEVELOPMENT

NONE.

(d) BACKGROUND OF INVENTION

1. Field of Invention

This invention relates to polybenzimidazole articles and the process for their production. More particularly, the invention relates to substituted polybenzimidazole membranes that can be utilized for separatory devices and the process for their production.

2. Prior Art

In recent years there has been increasing interest expressed in microporous membranes of a semipermeable nature which are useful in separation techniques. Separation techniques which employ such membranes include electrodialysis, ultrafiltration, reverse osmosis, etc.

Semipermeable membranes prepared in the past have been formed from a variety of materials, and are characterized by the ability to permit a component (e.g., ions or molecules) of a solution to pass through a membrane to the substantial exclusion of other components (e.g., other ions or molecules). Examples of substances heretofore recognized to possess this property include cellophane (i.e., regenerated cellulose), cellulose esters (e.g., cellulose acetate, cellulose, butyrate, etc.), animal or protein membranes, polyelectrolyte complexes, ethyl cellulose, cross-linked polyacrylates, etc.

The semipermeable membranes of the prior art are of limited applicability in many separatory processes because of inherent disadvantages relating to their chemical stability, strength, thermal stability, efficiency, length of life and cost. See for example U.S. Pat. Nos. 3,133,132 and 3,567,632. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling the solution. Furthermore, some membranes exhibit a decided decrease in efficiency upon an increase in temperature or pressure thereby limiting their range of applicability. Solvent susceptibility may be another factor affecting the applicability of a particular porous membrane to a separation process. Additionally, semipermeable membranes may be inappropriate for a particular application due to low solute rejection values or low flux.

The chemical resistance properties of the prior art separatory membranes have been their greatest shortcoming. Although the separation of solutions comprising only sodium chloride and water present few chemical resistance problems to the prior art membranes, such pure solutions are rarely found. Many naturally occurring saline solutions contain materials which degrade previously known membranes. For example, cellulose acetate and amide-linked polymers, such as those disclosed in U.S. Pat. No. 3,567,632, are subject to either base or acid catalyzed hydrolysis even in weakly basic or acidic solutions. Other compounds which may degrade the prior art membranes include formic acid, acetone and bisulfite ions.

An additional problem of prior art membranes and ultrafilters has been their inability to filter over a broad range of flux and $g/f^2/d$. Many of the prior art membranes or ultrafilters could filter only within a very limited flux and $g/f^2/d$ range.

In an attempt to overcome certain of the above-noted disadvantages of prior art membranes, membranes comprised of polybenzimidazole polymers have been provided. See, for example, U.S. Pat. Nos. 3,669,038; 3,720,607; 3,737,042; 3,841,492; 3,851,025; 4,020,142 and 4,512,894, each of which is incorporated herein by reference.

Typical processes for preparing polybenzimidazoles are described in the *Journal of Polymer Science*, Vol. 50, p. 511 (1961), and in various United States patents. U.S. Pat. No. Re. 26,065 describes a method for preparing high molecular weight, aromatic, polybenzimidazole polymers by melt polymerizing an aromatic tetraamine and a diphenyl ester or an aromatic, dicarboxylic acid anhydride at an elevated temperature and thereafter further polymerizing the product of the melt polymerization in the solid state. According to this process, in order to produce polymers of sufficiently high molecular weight to be suitable for practical use, it is necessary to pulverize the product of the melt polymerization prior to polymerization in the solid state and to conduct the solid state polymerization at an elevated temperature under a reduced pressure of less than 0.5 mm Hg or at an elevated temperature and in an inert gas stream over a prolonged period of time.

U.S. Pat. No. 3,313,783 describes another process which involves the solution polymerization in polyphosphoric acid of an inorganic acid salt of an aromatic tetraamine and a dicarboxylic acid, or a derivative thereof.

Another process for producing polybenzimidazoles is described in U.S. Pat. No. 3,509,108. In the process the monomers are initially reacted in a melt phase polymerization at a temperature above 200° C. and a pressure above 50 psi. The reaction product is then heated in a solid state polymerization at a temperature above 300° C. to yield the final aromatic polybenzimidazole product. The process requires the initial reaction to be conducted at a pressure above 50 psi (preferably, between 300–600 psi) in order to control the foaming encountered during the polymerization.

U.S. Pat. No. 3,555,389 describes a two-stage process for the production of aromatic polybenzimidazoles. The monomers are heated at a temperature above 170° C. in a first stage melt polymerization zone until a foamed prepolymer is formed. The foamed prepolymer is cooled, pulverized, and introduced into a second stage polymerization zone where it is heated in the presence of phenol to yield a polybenzimidazole polymer product.

U.S. Pat. No. 3,433,772 describes a two stage polymerization process for the production of aromatic polybenzimidazoles which utilizes an organic additive, such as an alkane having 11-18 carbon atoms or a polycarboxylic hydrocarbon, in order to control foaming during the first stage.

Other United States patents relating to one-stage and two-stage production of polybenzimidazoles include U.S. Pat. Nos. 3,408,336; 3,549,603; 3,708,439; 4,154,919 and 4,312,976. All patents enumerated herein are incorporated by reference.

Polybenzimidazole polymers are valuable for the production of high temperature, stable, molded and extruded products, such as films and fibers. While polybenzimidazole articles have been quite useful as membranes and ultrafilters, they are by nature hydrophobic and, therefore cannot be wet with hydrophilic solvents. The hydrophobic character of the polybenzimidazole polymers limits the ability of these polymers for some applications, such as wet films and the like. Further, their range as ultrafilters is quite limited.

While polybenzimidazole membranes are generally resistant to chemical attack, they are sometimes subject to chlorine attack at the imidazole nitrogen-hydrogen bond. Substituted polybenzimidazole polymers are useful in solving this particular problem. U.S. Pat. No. 3,578,644 describes the preparation of hydroxyl modified polybenzimidazole by reacting a polybenzimidazole polymer with an omega halo alkanol or a 1,2-alkylene oxide in the presence of a basic catalyst such as sodium hydride. The use of an omega halo alkanol reactant requires a basic catalyst, and an inorganic salt is formed as a by-product. In addition, the use of a gaseous alkylene oxide reactant requires a pressurized vessel for the reaction medium. Further, the halo alkanol reaction does not produce hydroxyl substitution on some types of polybenzimidazole, such as poly-2,2'-(m-phenylene)-5,5'-bibenzimidazole and other similar polybenzimidazoles where the bridging group between the reactive imidazole rings creates steric hindrance to the reactivity of the imidazole nitrogens.

Accordingly, it is an object of this invention to prepare modified polybenzimidazole polymer membranes.

It is a further object of this invention to prepare novel hydroxyalkylated polybenzimidazole polymer membranes.

It is a still further object of the present invention to prepare a substituted polybenzimidazole membrane wherein the flux rate can be controlled.

It is another object of this invention to prepare substituted polybenzimidazole polymer membranes with increased hydrophilicity.

It is a still further object of the invention to provide an improved semipermeable membrane which can serve as an ultrafilter for a broad range of molecular weight molecules.

These and other objects, as well as the scope, nature, and utilization of this invention, will be apparent from the following detailed description.

(e) SUMMARY OF INVENTION

In accordance with the present invention, there is provided a semipermeable polybenzimidazole membrane which is produced by the following steps:
(a) preparing a solution of a polybenzimidazole polymer;
(b) reacting the polybenzimidazole polymer with a cyclic carbonate to form a substituted polybenzimidazole polymer; and
(c) producing a substituted polybenzimidazole semipermeable membrane from that polymer.

The membrane produced by this process can be formed into a broad range of ultrafilters or other such products useful as separatory mediums.

(f) DETAILED DESCRIPTION OF INVENTION THE STARTING MATERIAL

The polybenzimidazole starting materials are a known class of heterocyclic polymers which are characterized by a recurring monomer unit which corresponds to the following Formula I or II. Formula I is:

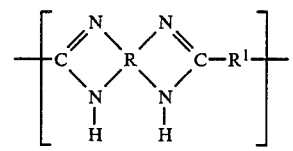

where R is a tetravalent aromatic nucleus with the nitrogen atoms forming the benzimidazole rings being paired upon adjacent carbon atoms, i.e., ortho carbon atoms, of the aromatic nucleus, and $R^1$ is a divalent substituent selected from aliphatic, alicyclic and aromatic radicals. Illustrative of $R^1$ substituents are divalent organic radicals containing between about 2-20 carbon atoms, such as ethylene, propylene, butylene, cyclohexylene, phenylene, pyridine, pyrazine, furan, thiophene, pyran, and the like.

Formula II corresponds to the structure:

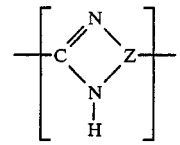

where Z is an aromatic nucleus having the nitrogen atoms forming the benzimidazole ring paired upon adjacent carbon atoms of the aromatic nucleus.

The above illustrated polybenzimidazoles can be prepared by various known processes, as described in the Background Of Invention section.

The following generalized equation illustrates the condensation reaction which occurs in forming the polybenzimidazoles having the recurring units of Formula I:

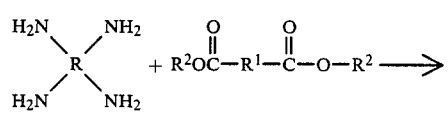

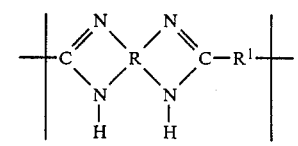

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R^2$ in the compounds shown are substituents selected from aliphatic, alicyclic and aromatic groups.

Examples of polybenzimidazoles which have the recurring structure of Formula I include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2'2"-(m-phenylene)-5'-5"-di(benzimidazole)-propane-2,2; and
poly-2,2'-(m-phenylene)-5',5"-di(benzimidazole)-ethylene-1,2.

The preferred polybenzimidazole of Formula I is poly-(2,2'-(m-phenylene)-5,5'-bibenzimidazole as characterized by the recurring monomeric unit:

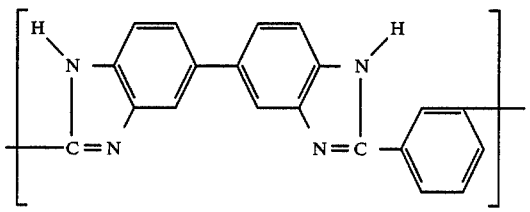

The polybenzimidazoles having the recurring monomer unit of Formula II can be prepared by the autocondensation of at least one aromatic compound having a pair of amine substituents in an ortho position relative to each other and carboxylate ester group positioned upon an aromatic nucleus. Examples of such compounds are esters of diaminocarboxylic acids which include 3,4-diaminobenzoic acid; 5,6-diaminonaphthalene-1-carboxylic acids which include 3,4-diaminobenzoic acid; 5,6-diaminonaphthalene-1-carboxylic acid; 5,6-diaminonaphthalene-2-carboxylic acid; 6,7-diaminonaphthalene-1-carboxylic acid; 6,7-diaminonaphthalene-2-carboxylic acid, and the like. A preferred compound is 4-phenoxycarbonyl-3',4'-diaminodiphenyl ether:

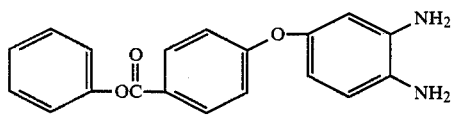

The polymer obtained with 4-phenoxycarbonyl-3',4'-diaminodiphenyl ether is poly-5-(4-phenyleneoxy)benzimidazole.

A polybenzimidazole starting material for the present invention process typically will exhibit an inherent viscosity between about 0.1–1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000–100,000.

THE CARBONATE REACTION

One or more objects of the present invention are accomplished by a hydroxyalkyl substituted polybenzimidazole polymer article produced by reacting a cyclic carbonate with a polybenzimidazole polymer in an organic solvent medium. The cyclic carbonate is of the following general formula:

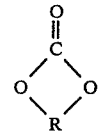

wherein R is a $C_2$–$C_6$ alkyl group. One or more of the alkyl sites may be substituted by a monovalent member selected from the group consisting of hydrogen, alkyl, substituted alkyl, aryl or substituted aryl substituents. In a preferred embodiment the cyclic carbonate is ethylene carbonate.

The carbonate reactant can be employed essentially in any molar quantity with respect to the polybenzimidazole starting material to produce various percentages of substitution. Preferably, the carbonate reactant is employed in at least a stoichiometric quantity with respect to the reactive imidazole hydrogen sites on the polybenzimidazole polymer. In a preferred embodiment, the ratio of carbonate reactant groups to each reactive imidazole group is from about 10 to about 20 to 1. It is desirable to achieve at least about a 10 percent substitution of the reactive imidazole hydrogen sites with the hydroxyalkyl group. In a preferred embodiment substitutions of at least about 40 percent are obtained. The hydrophilicity of a substituted polybenzimidazole product increases as the percentage of substitution increases.

The hydroxyalkylation reaction between the cyclic carbonate and polybenzimidazole typically is conducted at a temperature between about 30° and about 225° C. for a reaction period between about 0.5–24 hours. The reaction can be accomplished conveniently at ambient pressures. In a preferred embodiment the reaction occurs at about 145° C. to about 210° C. for about 3 to about 5 hours.

The concentration of the polybenzimidazole and cyclic carbonate reactants in the organic solvent reaction medium is limited only by the solubility of the polybenzimidazole in the solvent. Generally the polybenzimidazole concentration in the organic solvent medium will be in the range between about 1–30 percent by weight, based on the total weight of the reaction medium. The molecular weight of the polybenzimidazole is a factor in determining the maximum solute weight of the polymer in the organic solvent reaction medium. In a preferred embodiment polybenzimidazole dopes of about 15 to about 25 percent are used.

Organic solvents suitable for purposes of the present invention include N,N-dimethylformamide, N,N-dimethylacetamide, dimethylsulfoxide, N-methyl-2-pyrrolidone, and the like.

When ethylene carbonate is used as a reactant, the substituted polybenzimidazole produced is hydroxyethylated polybenzimidazole as follows:

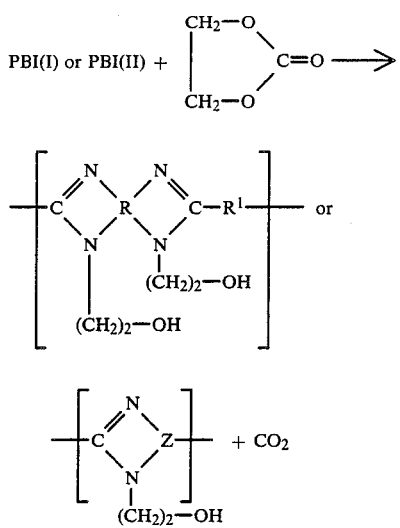

The (I) and (II) repeating units correspond to the Formula I and Formula II structures as previously defined.

After the reaction process is completed, the hydroxyalkyl substituted polybenzimidazole can be recovered by any conventional procedures, such as by vacuum distillation of the solvent medium to provide a residual polymeric solid, or by precipitation of the polymer from the solvent medium by addition of a non-solvent such as methanol or hexane. The substituted polybenzimidazole polymer of the present invention can be cast molded into membranes.

SEMIPERMEABLE FLAT FILM MEMBRANE FORMATION

To form a semipermeable flat film membrane a solution of the substituted polybenzimidazole polymer is deposited upon a support to form a wet film of the same. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. The thickness of the wet film deposited upon the support is influenced by the desired thickness of the semipermeable membrane ultimately to be produced.

A quantity of solvent is next evaporated from the exposed surface of the wet film to allow the formation of a relatively thin solid layer (i.e., a thin porous polymeric film) on the exposed surface of the same. The thin solid film commonly exhibits a thickness of about 0.01 to 20 microns, and preferably about 1 to 10 microns. During the formation of the solid layer of the exposed surface of the film, the solvent present near the surface of the wet film is flashed off and a thin coagulated solid layer of skin of the substituted polybenzimidazole polymer remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess a liquid consistency.

The resulting film bearing a thin solid layer upon its surface is next converted to a semipermeable membrane suitable for separating components of a solution by washing the same with a non-solvent for the substituted polybenzimidazole polymer which is capable of removing residual quantities of the polybenzimidazole solvent. During the wash step, the remaining substituted polybenzimidazole polymer within the wet film is coagulated while the solvent which originally dissolved the same is removed. The wash medium is preferably aqueous in nature and is most preferably water. The wash step is preferably carried out by immersing the film in the wash medium. Alternatively, any other convenient means for contacting the film with the wash medium may be utilized, such as by spraying the film with the same. The time required to accomplish coagulation of the remaining substituted polybenzimidazole polymer and the substantially complete removal of residual solvent for the same varies with the temperature of the wash medium. Satisfactory wash times commonly range from about 30 seconds to 20 minutes, and preferably about 2 to 5 minutes. Considerably longer wash times may be employed, but generally with no commensurate advantages.

The resulting flat film membranes formed from the substituted polybenzimidazole polymer consist of an outer, relatively thin, surface layer formed during the evaporation step adjacent to a relatively thin, surface layer formed during the evaporation step adjacent to a relatively thick layer of a more porous structure formed during the wash step.

It is not crucial that the substituted polybenzimidazole semipermeable membrane be annealed. The substituted polybenzimidazole membrane shows remarkable stability and resistance to chemical attack and functions well as an ultrafilter without being annealed. Such membranes will filter broad ranges of molecules with molecular weights from 10,000 to about 100,000. However, the filtration range of the substituted polybenzimidazole polymer membrane may be enhanced by an annealing step. Such an annealing step will lower the molecular weight of the molecules which the ultrafilter will satisfactorily filter to about 1,000. The annealing may also increase the strength of the membrane. The semipermeable polybenzimidazole may be annealed by any conventional procedure well known in the art.

The substituted polybenzimidazole membranes of the present invention, once positioned upon a conventional porous support, such as a porous steel plate, may be utilized to separate components of a solution by a variety of techniques, preferably ultrafiltration. For instance, the membranes of the present invention may be used to good advantage in those areas where cellulose acetate separatory membranes have been used heretofore. However, because of the increased thermal and chemical stability exhibited by the substituted polybenzimidazole membranes, a greater range of operating conditions may be employed.

EXAMPLES

Example 1

This example illustrates the preparation of a polybenzimidazole starting material for the invention process.

Into a three-necked flask equipped with a nitrogen inlet and outlet, mechanical stirrer and reflux condenser are placed 23.333 g (0.1089 moles) of 3,3',4,4'-tetraaminobiphenyl, 34.67 g (0.1089 moles) of diphenylisophthalate and 0.3 g of diphenylphosphinic acid. The flask is degassed and then filled with nitrogen. The degassing is repeated at least three times. The mixture is heated rapidly with stirring to 225° C. The stirring is stopped. The temperature of the reaction mixture is then raised to 270° C. and held at that temperature for 1.5 hours. The resulting product is cooled to room temperature and then is ground.

The ground prepolymer is placed in a flask and after the degassing step is repeated, the prepolymer is heated at 360° C. for one hour. The resulting polybenzimidazole exhibits an average molecular weight of 201,700 with a molecular weight distribution of 2.91 and an inherent viscosity of 1.00 dl/g when measured in a concentration of 0.4 g of the polybenzimidazole in 100 ml of 97 percent sulfuric acid.

A polybenzimidazole polymer as prepared above is further characterized by a Plugging Value of greater than about 0.5, and a Gardner color of less than about 10.

Example 2

This example illustrates the preparation of a hydroxyethylated polybenzimidazole in accordance with the present invention's process.

A 1.31 g quantity of fiber grade poly-2,2'-(m-phenylene)-5,5'-bibenzimidazole (inherent viscosity of 0.73 dl/g) containing 4.7 weight percent lithium chloride is added to 100 ml of 99 mole percent dimethylformamide in a three-neck, 500 ml round bottom flask fitted with a reflux condenser and inlet and outlet gas lines. After the polymer is dissolved, 3.72 g of 98 percent ethylene carbonate is added. The solution is refluxed with stirring under nitrogen for 5 hours.

After cooling, the modified polymer is precipitated with methanol. The solids are separated by vacuum filtration, and then are dried overnight in a vacuum oven. A yield of 0.98 g of hydroxyethylated polybenzimidazole is recovered, which has a 60–70 percent degree of hydroxyethyl substitution of the original reactive imidazole nitrogen sites.

Example 3

This example illustrates the preparation of hydroxyethylated polybenzimidazoles in accordance with the present invention process.

A mixture of 72 g of poly-2,2'(m-phenylene)-5,5'-bibenzimidazole powder, 10 g lithium chloride and 318 g of dimethylacetamide are heated at 240° C. for 2 hours in a high pressure reactor which is rotated while heating. At the end of the heating period, the reactor and its contents are cooled to room temperature. The resultant viscous, brown, liquid, reaction medium is vacuum filtered to remove any insoluble material.

The recovered reaction medium (111.6 g) is mixed in a 500 ml, three-neck, round bottom distilling flask fitted with a mechanical stirrer, nitrogen purge inlet and a water-cooled reflux condenser. Ethylene carbonate (11.86 g) is added, and the reaction medium is stirred under a nitrogen atmosphere and gradually heated until the solvent begins to reflux. Refluxing is maintained for 5 hours, and then the reaction medium is cooled to room temperature with stirring.

The hydroxyethylated polybenzimidazole product is recovered in the same manner as in Example 2.

If the starting polymer is poly-5-(4-phenyleneoxy)-benzimidazole, the resultant product of the process is hydroxyethylated poly-5-(4-phenyleneoxy)benzimidazole, which has an 80–90 percent degree of hydroxyethyl substitution.

Example 4

A casting dope was prepared employing a N-dimethylacetamide solvent containing 18 percent by weight poly-2,2'(N-phenylene)-5,5'-bibenzimidazole (I.V. of 0.73 dl/g) based upon the total weight of the solution, and 2 percent by weight lithium chloride based upon the total weight of the solution. The dissolution of the polymer was accomplished by agitating the same while in particulate form with the N-dimethylacetamide solvent (in which the lithium chloride was previously dissolved) in a three-neck, round bottom flask fitted with a reflux condenser and inlet and outlet gas liner at a temperature of about 150° C. The solution was refluxed for 5 hours under argon. The resulting solution was next filtered to remove any residual solids.

Into a reactor equipped with a mechanical agitator, thermometer and reflux condenser were added 17 grams (0.19 eq.) of 98 percent pure ethylene carbonate and the above solution containing 29.3 grams (0.075 eq.) of polybenzimidazole. The reactor was heated to 160° C. and held at this temperature for one and one-half hours. The temperature of the reactor was increased to 183° C. and the contents were held at this temperature for three and one-half hours. The percentage of substitution from this reaction was approximately 20 percent.

A one mil wet film was cast from the dope prepared from the above on a non-woven polyester fabric marketed by Eaton-Dickman under the trademark Hollytex. The fabric was placed on a moving conveyor belt and a thin surface layer was formed by heating the film to about 50° C. in an air convection oven wherein air was forced over the surface of the film at a rate of about 200 ft. per minute. The membrane was maintained on the conveyor belt in the oven for about 30 seconds. The membrane was then coagulated for 16 minutes in a water bath maintained at 22° C. and then rolled up and stored in water. The resulting membrane exhibited a film thickness of about 1 mil, a flux of 593.7 gfd and a salt rejection percentage of 0.43. The above rates were measured in an Osmonics, Inc. flow loop maintained at 25° C. and 400 psi, employing an aqueous solution containing 0.5 percent sodium chloride.

Example 5

The wet film produced in Example 4 was annealed in an annealing bath of ethylene glycol at a temperature of 150° for five minutes. An Osmonics flow loop test was performed. The film exhibited a 18.6 gfd flux and a 91.3 percent salt rejection rate.

Example 6

A membrane cast by the procedure of Example 4 was annealed in an ethylene glycol bath at a temperature of 130° for five minutes. The flow loop test employed in Example 4 resulted in a membrane having a 45.1 gfd flux and a salt rejection of 41.6 percent.

As can be seen, membranes cast utilizing this procedure have large flux ranges from about 600 to about 18 gf$^2$d. This is a substantial improvement over unsubstituted polybenzimidazole membranes whose flux range is normally between 50 and 10 gf²d.

What is claimed is:

1. The semipermeable membrane produced by the process comprising the steps of:
   (a) preparing a solution of a polybenzimidazole polymer;
   (b) reacting the polybenzimidazole polymer with a cyclic carbonate to form a substituted polybenzimidazole polymer; and
   (c) producing a semipermeable membrane product from the substituted polybenzimidazole polymer solution.

2. The membrane of claim 1 wherein the cyclic carbonate has a general formula of:

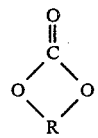

wherein R is a C₂-C₆ alkyl substituent; one or more of the alkyl sites may be substituted by a monovalent member selected from the group consisting of hydrogen, alkyl, substituted alkyl, aryl or substituted aryl substituent.

3. The membrane of claim 2 wherein the cyclic carbonate is ethylene carbonate.

4. The membrane of claim 1 wherein the cyclic carbonate is employed in at least a stoichiometric quantity with respect to the reactive imidazole hydrogen sites on the polybenzimidazole polymer.

5. The membrane of claim 4 wherein the ratio of the cyclic carbonate reactive groups to the polybenzimidazole imidazole group is from about 5 to about 30 to one.

6. The membrane of claim 4 wherein the ratio of the cyclic carbonate reactive group to the polybenzimidazole imidazole group is from about 10 to about 20 to one.

7. The membrane of claim 1 wherein the reaction is conducted at a temperature between about 30° and about 225° C. for a period of about 0.5 to about 24 hours.

8. The membrane of claim 7 wherein the reaction is conducted at a temperature between about 145° C. and about 215° C. for a period of about 3 to about 5 hours.

9. The membrane of claim 1 wherein at least about 10 percent of the reactive imidazole hydrogen sites are substituted with hydroxyalkyl substituents.

10. The membrane of claim 9 wherein at least about 40 to about 100 percent of the reactive imidazole hydrogen sites are substituted with hydroxyalkyl substitutions.

11. The membrane of claim 1 wherein the polybenzimidazole polymer starting material is characterized by recurring monomeric units of:

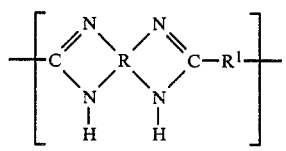

where R is a tetravalent aromatic nucleus with the nitrogen atoms forming the benzimidazole rings being paired upon adjacent carbon atoms, and R¹ is a divalent substituent selected from aliphatic, alicyclic and aromatic radicals containing between about 2-20 carbon atoms.

12. The membrane of claim 1 wherein the polybenzimidazole polymer starting material is comprised of recurring monomeric units of:

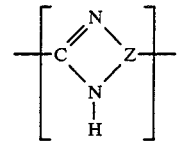

wherein Z is an aromatic nucleus having the nitrogen atoms forming the benzimidazole ring paired upon adjacent carbon atoms of the aromatic nucleus.

13. The membrane of claim 1 wherein the polybenzimidazole starting material is poly-2,2'-(m-phenylene)-5,5'-bibenzimidazole.

14. The membrane of claim 1 wherein the polybenzimidazole polymer starting material is poly-5-(4-phenyloxy)-benzimidazole.

15. The membrane of claim 1 wherein the concentration of the polybenzimidazole in the solvent medium is in the range of about 1 to about 30 percent by weight.

16. The membrane of claim 1 wherein the concentration of the polybenzimidazole in the solvent medium is in the range of about 15 to about 25 percent by weight.

17. The membrane of claim 1 wherein the polybenzimidazole starting material exhibits an inherent viscosity between about 0.1 and about 1.0 dl/g when measured at a concentration of 0.4 grams in 100 ml of 97 percent sulfuric acid at 25° C.

18. The membrane of claim 1 characterized by recurring monomeric units of:

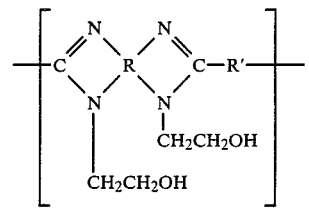

wherein R is a tetravalent aromatic nucleus with the nitrogen atoms forming the benzimidazole rings being paired upon adjacent carbon atoms, and R' is a divalent substituent selected from aliphatic, alicyclic and aromatic radicals containing between about 2-20 carbon atoms.

19. The membrane of claim 1 characterized by recurring monomeric units of:

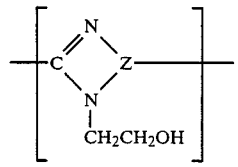

wherein Z is an aromatic nucleus having the nitrogen atoms forming the benzimidazole ring paired upon adjacent carbon atoms of the aromatic nucleus.

20. The membrane of claim 1 wherein the solvent capable of dissolving the polybenzimidazole is selected from the group consisting of N,N-dimethylacetamide, N,N-dimethylformamide, dimethylsulfoxide and N-methyl-2-pyrrolidone.

21. The membrane of claim 20 wherein the solvent is N-methyl-2-pyrrolidone.

22. The membrane of claim 20 wherein the solvent is N,N-dimethylacetamide.

23. The semipermeable membrane produced in accordance with the process comprising the steps of:
(a) preparing a solution of a polybenzimidazole polymer wherein the the starting material is characterized by recurring monomeric units of:

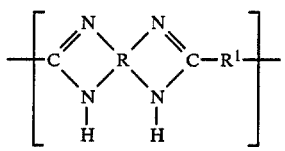

where R is a tetravalent aromatic nucleus with the nitrogen atoms forming the benzimidazole rings being paired upon adjacent carbon atoms, and $R^1$ is a divalent substituent selected from aliphatic, alicyclic and aromatic radicals containing between about 2–20 carbon atoms;
(b) reacting the polybenzimidazole polymer with a cyclic carbonate at a temperature of about 30° C. to about 225° C. for a period of about 0.5 to about 24 hours to form a hydroxyalkyl substituted polybenzimidazole polymer with a general formula of:

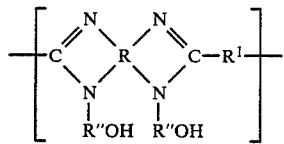

wherein R and $R^1$ are as above and R'' is a $C_1$ to $C_6$ alkyl substituent; and
(c) producing a semipermeable membrane from that substituted polybenzimidazole polymer solution.

24. The semipermeable membrane produced in accordance with the process consisting of the steps of:
(a) preparing a solution of poly-2,2'(m-phenylene)-5,5'-bibenzimidazole dissolved in N-methyl,2-pyrrolidone;
(b) reacting the polybenzimidazole polymer with ethylene carbonate at a temperature of about 30° C. to about 225° C. for a period of about 0.5 to about 24 hours wherein the ratio of reactive carbonate groups to reactive imidazole polybenzimidazole groups is from about 10 to about 20 to 1 to form a hydroxyethylated polybenzimidazole polymer; and
(c) producing a hydroxyethylated polybenzimidazole semipermeable membrane from that substituted polybenzimidazole polymer solution.

25. The membrane of claim 23 wherein the cyclic carbonate is employed in at least a stoichiometric quantity with respect to the reactive imidazole hydrogen sites on the polybenzimidazole polymer.

26. The membrane of claim 23 wherein the ratio of the cyclic carbonate reactive groups to the polybenzimidazole imidazole group is from about 5 to about 30 to one.

27. The membrane of claim 23 wherein the ratio of the cyclic carbonate reactive group to the polybenzimidazole imidazole group is from about 10 to about 20 to one.

28. The membrane as in any of claims 23 or 24 wherein at least about 10 percent of the reactive imidazole hydrogen sites are substituted with hydroxyalkyl substituents.

29. The membrane as in any of claims 23 or 24 wherein at least about 40 to about 100 percent of the reactive imidazole hydrogen sites are substituted with hydroxyalkyl substitutions.

30. The membrane as in any of claims 23 or 24 wherein the concentration of the polybenzimidazole in the solvent medium is in the range of about 1 to about 30 percent by weight.

31. The membrane as in any of claims 23 or 24 wherein the concentration of the polybenzimidazole in the solvent medium is in the range of about 15 to about 25 percent by weight.

32. The membrane as in any of claims 23 or 24 wherein the polybenzimidazole starting material exhibits an inherent viscosity between about 0.1 and about 1.0 dl/g when measured at a concentration of 0.4 grams in 100 ml of 97 percent sulfuric acid at 25° C.

33. The membrane as in any of claims 23 or 24 wherein the solvent capable of dissolving the polybenzimidazole is selected from the group consisting of N,N-dimethylacetamide, N,N-dimethylformamide, dimethylsulfoxide and N-methyl-2-pyrrolidone.

34. The membrane of claim 23 wherein the solvent is N-methyl-2-pyrrolidone.

35. The membrane of claim 23 wherein the solvent is N,N-dimethylacetamide.

* * * * *